United States Patent
Christman et al.

(10) Patent No.: US 8,651,162 B2
(45) Date of Patent: Feb. 18, 2014

(54) HINGED TUBULAR HEATER FOR SIDE SEALING MACHINE

(75) Inventors: Russell Christman, Dunstable, MA (US); Thomas Orsini, Leominster, MA (US); Todd Brown, Arlington, MA (US); Jeffrey Potts, Gaylordsville, CT (US)

(73) Assignee: Shanklin Corporation, Ayer, MA (US)

( * ) Notice: Subject to any disclaimer, the term of this patent is extended or adjusted under 35 U.S.C. 154(b) by 345 days.

(21) Appl. No.: 13/195,117

(22) Filed: Aug. 1, 2011

(65) Prior Publication Data

US 2013/0032295 A1     Feb. 7, 2013

(51) Int. Cl.
   *B32B 37/00*     (2006.01)
(52) U.S. Cl.
   USPC ........ 156/553; 156/555; 156/582; 156/583.1; 156/583.4; 156/583.5
(58) Field of Classification Search
   USPC .............. 156/553, 555, 580, 581, 582, 583.1, 156/583.4, 583.5; 53/459, 463, 469, 477, 53/479, 550, 568, 372.4
   See application file for complete search history.

(56) References Cited

U.S. PATENT DOCUMENTS

| | | | |
|---|---|---|---|
| 3,765,990 A | 10/1973 | Histed et al. | |
| 4,219,988 A | 9/1980 | Shanklin et al. | |
| 4,608,797 A | 9/1986 | Shabram, Jr. et al. | |
| 4,613,746 A | 9/1986 | MacLaughlin | |
| 4,722,168 A | 2/1988 | Heaney | |
| 5,603,801 A | 2/1997 | DeFriese et al. | |
| 6,526,728 B1 | 3/2003 | Sorenson et al. | |
| 7,281,362 B2 | 10/2007 | James et al. | |
| 7,637,299 B2 | 12/2009 | King, Jr. et al. | |
| 7,685,795 B2 | 3/2010 | King, Jr. et al. | |
| 2003/0129373 A1 | 7/2003 | Migliorini et al. | |
| 2006/0107622 A1 | 5/2006 | James et al. | |
| 2007/0006973 A1 | 1/2007 | King, Jr. et al. | |
| 2013/0031870 A1 | 2/2013 | Christman et al. | |

OTHER PUBLICATIONS

International Search Report and Written Opinion mailed Jul. 6, 2012 in co-pending PCT case No. PCT/US2012/035404.
International Search Report and Written Opinion mailed Jul. 10, 2012 in corresponding PCT case No. PCT/US2012/035353.

*Primary Examiner* — James Sells
(74) *Attorney, Agent, or Firm* — Nields, Lemack & Frame, LLC (57) ABSTRACT

A tubular heating element which is resistant to damage caused by foreign material is disclosed. The tubular heating element is pivotably attached to the side sealing machine at its leading (upstream) edge. The trailing (downstream) edge of the tubular heating element is moved by means of a compressible force, such as an air cylinder. In this way, the air in the cylinder pushes the tubular heating element downward into the plane of the film. However, a foreign object located on the film can overcome the force of the air cylinder, thereby lifting the tubular heating element out of the path of the film.

17 Claims, 13 Drawing Sheets

HINGED TUBULAR HEATER FOR SIDE SEALING MACHINE

BACKGROUND OF THE INVENTION

Machines used to wrap and seal articles and packages in thermoplastic film are well known in the art. Two types of machines are commonly referred to as side-sealing and lap-sealing machines. In the typical side-sealing configuration, an article or set of articles travels, typically via a conveyer belt, toward the machine. A sheet of center-folded plastic film, having two layers, is fed from a direction, which is preferably perpendicular to the direction of the conveyer. The two layers of the film are then separated such that the article is placed between the lower layer and the upper layer. On one side of the article is the center-fold, while on the other side, there is an open edge where the two layers are not attached. The machine has several sets of belts to hold and guide the film, and a side sealing mechanism, which typically comprises a heating/sealing element that fuses or welds the two layers together and a cutting element that removes the excess material. In some embodiments, the heating element serves to cut the film as well. These elements, whether a unitary element or separate components, are referred to as the heating/sealing/cutting element throughout this disclosure. Thus, as the article passes by the side sealing mechanism, this open edge is sealed by welding the two layers together, the plastic is cut and the waste is removed and discarded. At this point, the plastic film resembles a tube, with openings at both the leading and trailing ends of the article, but sealed along both sides. As the article continues to advance, an end sealing mechanism is then employed to seal the film at the leading end of the article. The article is then advanced and the end sealing mechanism then seals the film at the trailing end of the article.

Incomplete, inconsistent or sloppy welds can be problematic with these types of machines. The choice of heating/sealing/cutting element, film thickness and film speed are all factors in determining the quality of the seal. It is possible that different types of side sealing mechanisms may optimize seals for certain configurations. For example, tubular heating elements may optimize seals for high speed and/or thick films, while heated cutting blades may optimize lower speed and/or thinner films.

One potential issue associated with side sealing units is clogging or jamming. Material, such as excess film or foreign objects may be drawn into the side sealing mechanism. For heating cutting blades, the size and shape of the device is such that the material does not cause damage to the heating element. However, tubular heating elements are much smaller, and thus are prone to damage in this scenario.

Therefore, a tubular heating element which is more resistant to damage caused by foreign material drawn into the side sealing mechanism would be beneficial.

SUMMARY OF THE INVENTION

The problems associated with the prior art have been overcome by the present invention, which describes a tubular heating element which is resistant to damage caused by foreign material. The tubular heating element is pivotably attached to the side sealing machine at its leading (upstream) edge. The trailing (downstream) edge of the tubular heating element is moved by means of a compressible force, such as an air cylinder. In this way, the air in the cylinder pushes the tubular heating element downward into the plane of the film. However, a foreign object located on the film can overcome the force of the air cylinder, thereby lifting the tubular heating element out of the path of the film.

DETAILED DESCRIPTION OF THE INVENTION

Figure 1:
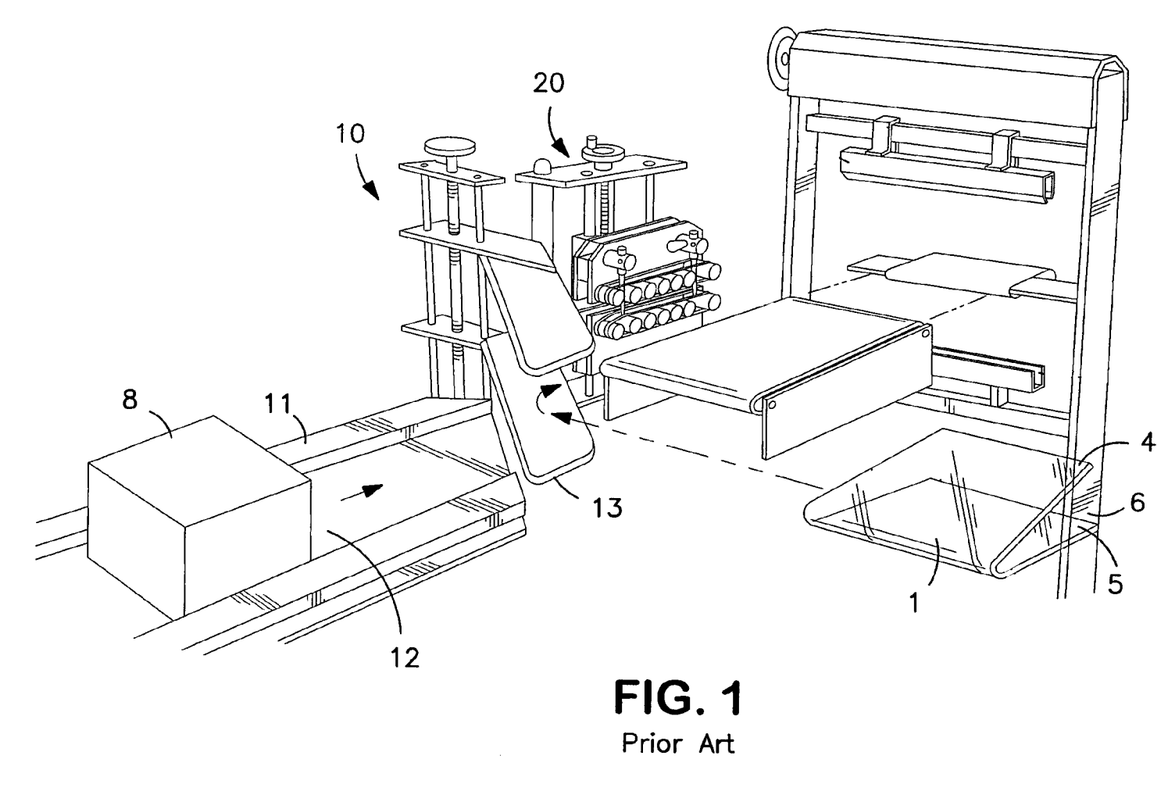
FIG. 1 illustrates a representative side-sealing machine of the prior art.

FIG. 1 illustrates a representative side-sealing machine used to encapsulate or wrap an article in thermoplastic film, as described in U.S. Pat. No. 6,526,728. The machine 10 utilizes a conveyer belt 12 operating at a relatively constant speed to deliver articles 8 that are to be encapsulated. The thermoplastic film 1 is center-folded, such that the side with the fold is closed, while the opposite side 6 is open. On this opposite side, there are two layers of film 4,5, which will later be sealed. This center-folded thermoplastic film 1 is fed from a reel (not shown) that is preferably mounted such that the film is fed perpendicular to the direction of travel of the conveyer belt 12. The film is then inverted and separated by an inverter 13 such that the article is enveloped between the two layers 4,5. At this point, the film 1 on one side of the article is closed, while the opposite side 6 remains open. Also, the film at both the leading and trailing ends of the article are not sealed. Downstream from the inverter is the side-sealing mechanism 20. After proper relative positioning of the article between the layers of the film 4,5, the enveloped article approaches the side-sealing mechanism 20.

The side-sealing mechanism 20 is located on the open side 6 of the enveloped article. The mechanism holds the two layers of film 4,5 together, and guides the layers through the heating and cutting means. It then welds the two layers together, and cuts off the surplus material. The surplus material is pulled away so as not to reattach to the film while it is still at an elevated temperature.

Figure 2:
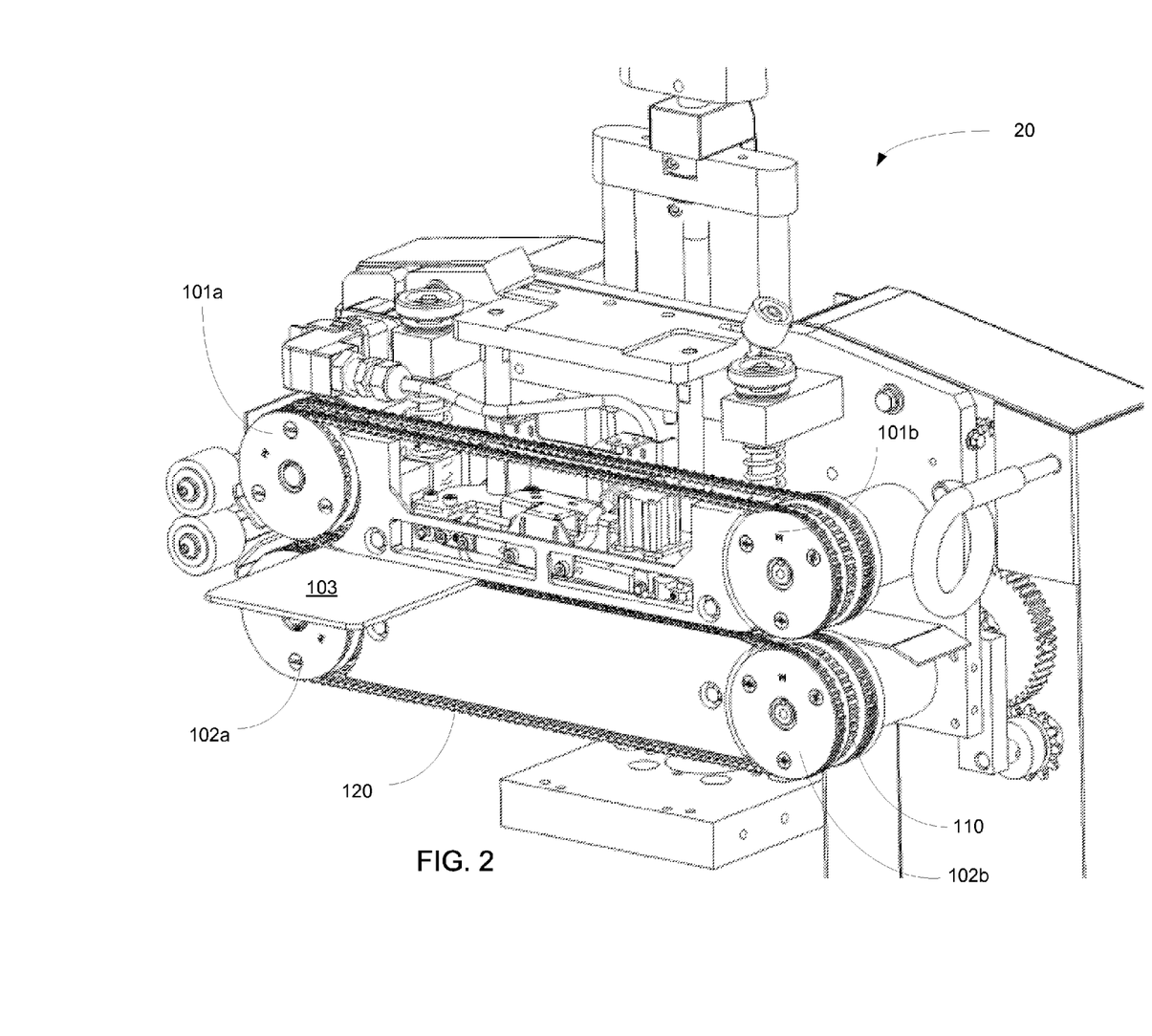
FIG. 2 illustrates a view of the side-sealing mechanism in accordance with the present invention.

As shown in FIG. 2, to perform these actions, the mechanism 20 preferably comprises two sets of cooperating pulleys, an upper set 101 and a lower set 102. These sets work in unison to pull the two layers of film 103 into the mechanism and hold the layers in place. In the preferred embodiment, each of the pulleys has teeth 110 in its channel so as to accept one or more, preferably two, timing belts 120. The presence of teeth 110 ensures that the timing belt does not slip relative to the pulleys. However, V belts can also be utilized with this invention, as well. The first set of pulleys 101 is located above the layers of film, while the second set 102 is located below the layers. Each set comprises a drive pulley 101a, 102a and a tail pulley 101b, 102b. There may optionally be one or more idler pulleys (not shown). Each of these pulleys also has one or more, preferably two, O-rings mounted in the channel where the belts are located, so as to provide individual channels for each of the timing belts.

Each of the timing belts preferably has a special gripping outer surface, that is bonded to a truly endless steel or Kevlar reinforced timing belt. Each corresponding set of belts has upper and lower pressure plates that are preset to insure good contact between the pair of belts.

Figure 3:
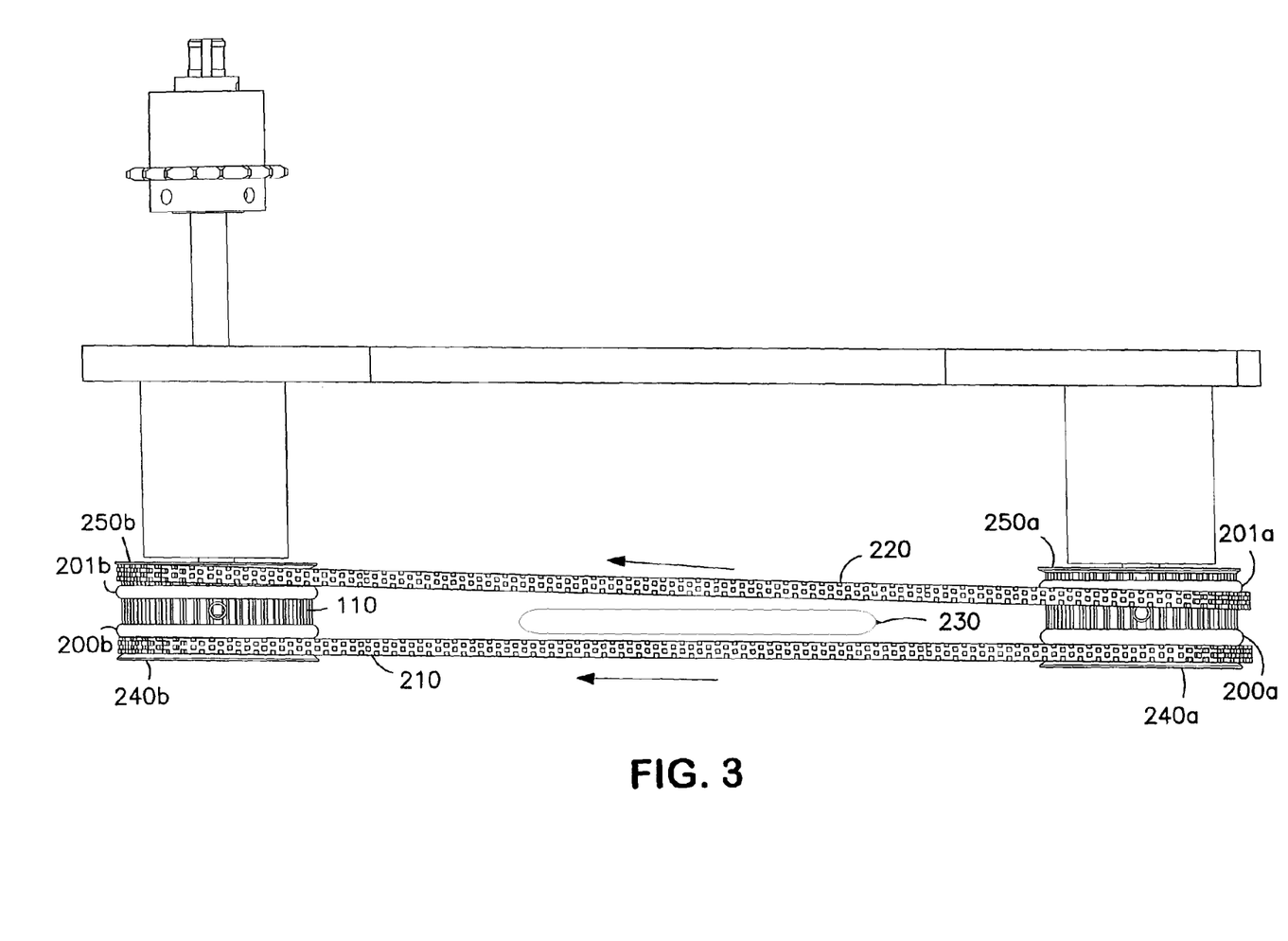
FIG. 3 illustrates a top view of the side-sealing mechanism shown in FIG. 2.

In one embodiment, as shown in FIG. 3, one set of O-rings 200 is positioned such that the movement of the outermost belt 210 is made to be parallel to the direction of the film movement. The outer wall of the pulley 240 and this first set of O-rings 200 provide the guides for the outermost belt 210. As shown in FIG. 3, O-ring 200a and O-ring 200b are equidistant from the outer wall of their respective pulleys. A second set of O-rings 201 is used to guide the innermost belt 220 in a path that diverges away from the direction of the film and the outermost belt. This can be accomplished in a number of ways. For example, a combination of one O-ring and the inner wall of the downstream pulley 250b can be used to define the channel for the innermost belt 220, as shown in FIG. 3. Similarly, two O-rings may be inserted on the upstream pulley to define a channel for the innermost belt. Alternatively, a single O-ring 201a, as shown in FIG. 3, can be used to define the inner wall of the channel for the innermost belt 220. Because of the divergence angle, there are no forces pushing the innermost belt 220 toward the outermost belt 210, thus the second O-ring may be eliminated. In other words, in the channel associated with the upstream pulley 240a, the O-ring 201a provides the inner guide for the belt 220. In the channel associated with the downstream pulley 240b, the O-ring 201b provides the outer guide for the belt 220. As a result, the innermost belt 220 is closest to the outermost belt 210 at the upstream pulley, and farthest away from it at the downstream pulley. The tubular heating element 230 is preferably located between the upstream and downstream pulleys. Thus, as the film passes the upstream pulley, it is still intact; however, it is cut before it reaches the downstream pulley. By introducing this divergence angle, the innermost belt 220 helps guide the unwanted surplus away from the film after it is cut. In the preferred embodiment, the innermost belt 220 is guided in the channel of the downstream pulley a distance further away from the film than on the upstream pulley sufficient to force the surplus plastic away from the film. One such suitable distance is about ¼ inch. This ensures that the surplus material does not reattach itself to the film while still at an elevated temperature. This surplus material is then held under tension and fed into a reel, which is later discarded. While the use of multiple belts, with a divergence between them is preferred, the use of a single belt, or multiple parallel belts is also within the scope of the present invention.

Figure 4:
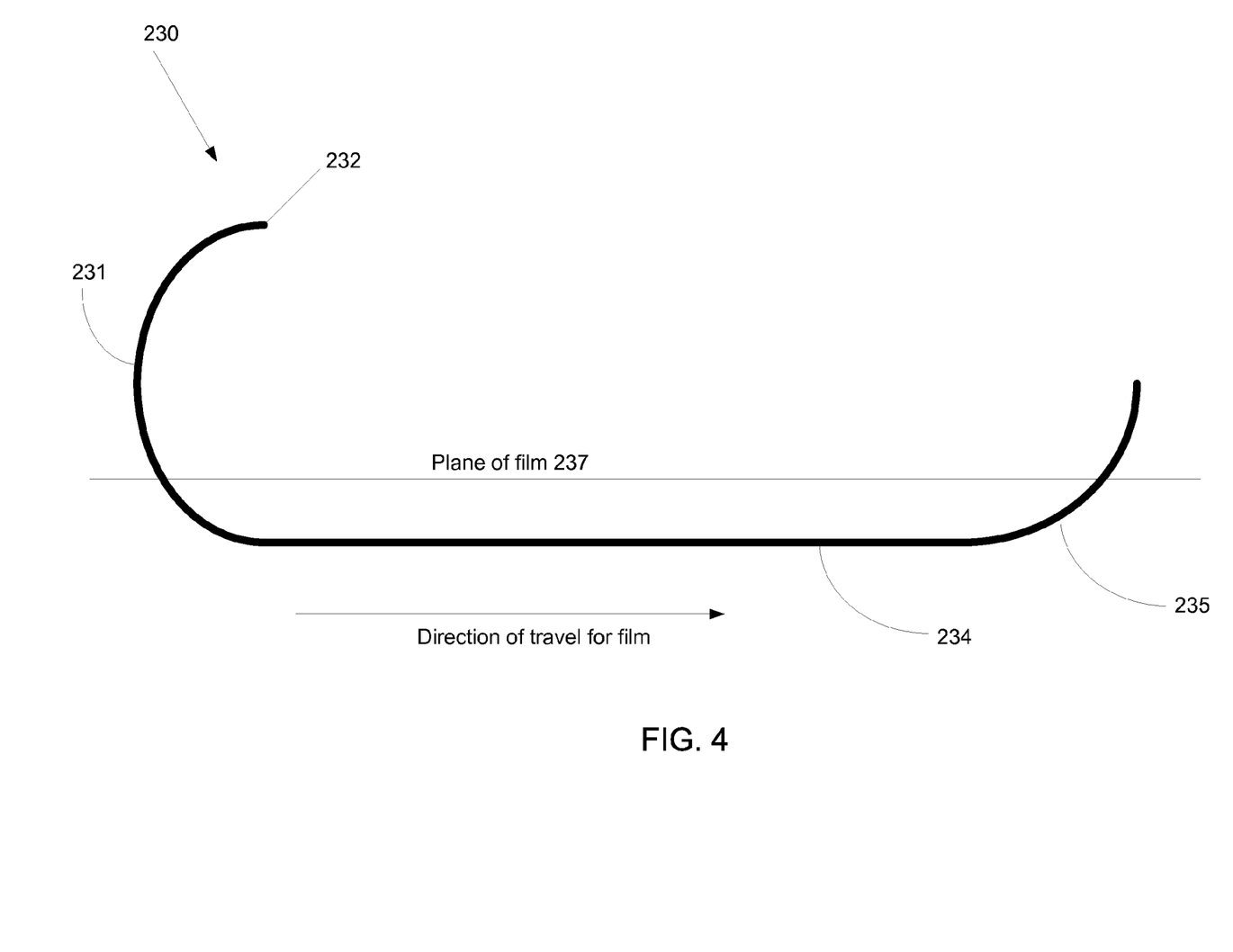
FIG. 4 illustrates the shape of a tubular heater and its relationship to the film.

The side-sealing mechanism 20 includes the tubular heating element 230. As described above, this element is preferably located between the upstream and downstream pulleys, so that it can seal and cut the film before it is separated by the downstream pulley. The tubular heating element 230 may be a tube, having a circular cross-section. The tubular heating element 230 may formed into an open oval, such as is shown in FIG. 4. The leading edge 231 of the tubular heating element may be semi-circular, and the first end 232 may contain the connections, such as electrical wires, which supply current allowing the heating element 230 to be heated. The tubular heating element 230 may have an extended straight portion 234, which terminates in a curvilinear trailing end 235, which may be mounted or supported, such as by one or more brackets. In some embodiments of the prior art, the tubular heating element 230 may be rigidly mounted to the machine 20, and positioned such that a portion of the tubular heating element rests beneath the plane of film 237. In other words, plane 237 is the horizontal level at which the tubular heating element 230 passes through the film. Thus, the leading edge 231 is responsible for initially heating and cutting the film.

One issue with this tubular heating element 230 is its potential susceptibility to foreign materials. Since the heating element 230 is rigidly mounted, it cannot be moved if it encounters a foreign object, or a gathered section of film. Thus, if the foreign object does not readily melt or move, it will contact the heating element 230, potentially damaging or misshaping the leading edge 231. In addition, the rigid mounting of the tubular heating element 230 implies that the same portion of the heating element initially contacts the film. Therefore, it is possible that melted film or other materials may build up on the initial point of contact with the film. Furthermore, different films may be different thicknesses and melting points. This rigidly mounted element forces all film types to be heated, sealed and cut in an identical manner.

Figure 5:
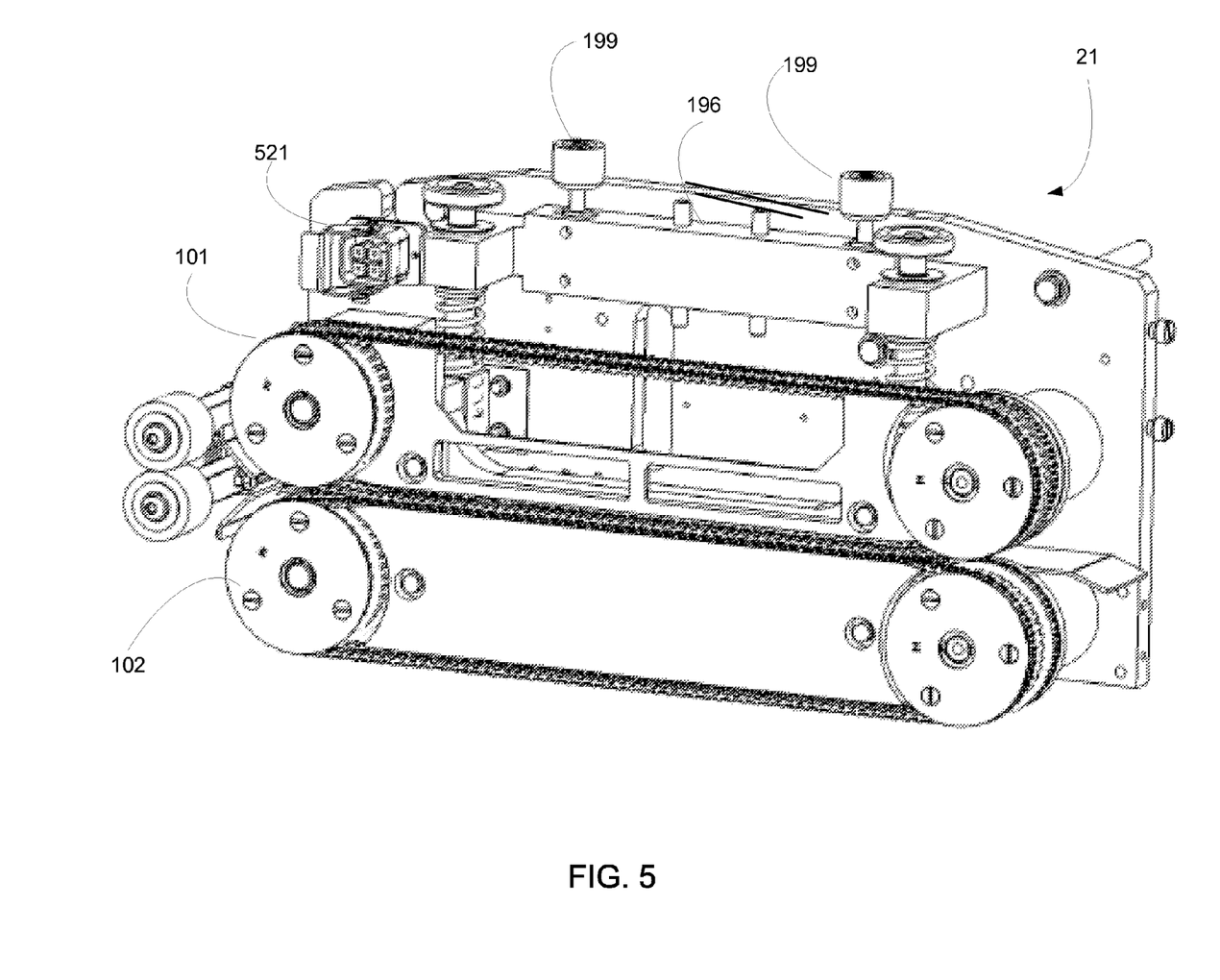
FIG. 5 illustrates a universal side mechanism.

This tubular heating element 230 may be attached to the side sealing mechanism 20 in a variety of ways. In one embodiment, it is part of a removable assembly that attaches to a universal side mechanism. FIG. 5 shows the universal side mechanism 21, which is the side sealing mechanism 20 without a tubular heating element installed. The universal side mechanism 21 includes two sets of cooperating pulleys, an upper set 101 and a lower set 102.

In addition, the universal side mechanism 21 has a mounting mechanism, designed to cooperate with a mounting mechanism on the tubular heating element. In this embodiment, the mounting mechanism includes a mounting platform 196. A mounting bracket on the tubular heating assembly is intended to rest on this mounting platform 196. In addition, in this embodiment, the connecting elements comprise two spring loaded captive members 199. To install a tubular heating assembly, the members are pulled upward such that the mounting ports of the tubular heating assembly can be slid in place under the head of the captive members 199. The universal side mechanism 21 may also include the distal end of the power connector 521, which mates with a power connector on the tubular heating element. In addition, the universal side mechanism 21 may also include a receptacle for the feedback connector 530 (not shown) and a receptacle for the air duct 510 (not shown). In other embodiments, the various connectors may not be located on the universal side mechanism 21, and may instead originate at other locations on the side sealing machine 10.

In other embodiments, the tubular heating element 230 may be rigidly attached to the side sealing mechanism 20, such that it is not readily removable. In such an embodiment, the mounting platform 196 and captive members 199 may be replaced with bolts or other fastening devices. In addition, the connections (such as air, power and feedback) may be implemented in a different manner.

The invention is not limited to any particular method of attaching the tubular heating element 230 to the side sealing mechanism 20.

Figure 6:
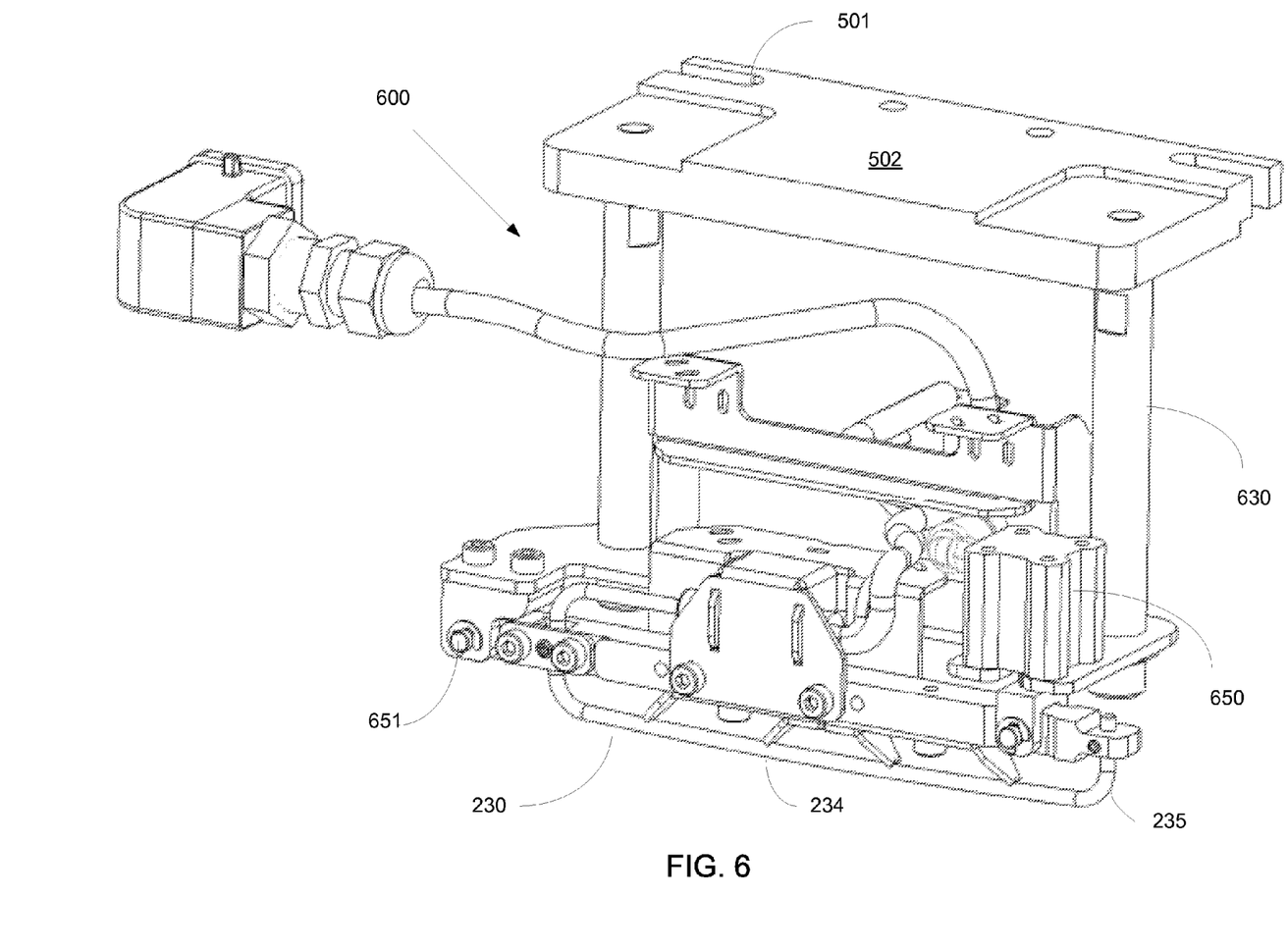
FIG. 6 shows a front view of the tubular heating element in the stowed position.

FIG. 6 shows a front view of a modular heating/sealing/cutting assembly 600 using a tubular heating element. This tubular heating assembly 600 may also be used with the universal side mechanism 21 shown in FIG. 5. The assembly 600 may have a round tubular heating element 230, which is made of a metal, such as stainless steel. The tube 230 is heated through the application of power to the tube. This power may be a constant voltage and a variable current. In other embodiments, this power is a variable voltage. In yet other embodiments, a digital value is passed to the tube 230, which represents the power to be used. The power from the sealing machine 10 passes to the tube via a power connector (not shown).

The heating tube 230 is suspended from mounting bracket 502, using extension brackets 630. As described above, mounting ports 501 are located on the mounting bracket 502. The length of extension brackets 630 is determined so that the heating tube 230 contacts the film when attached to the mounting platform 196 on the universal side mechanism 21 (see FIG. 5). As stated above, other methods of attaching the tubular heating assembly 600 to the universal side mechanism 21 may also be used.

The tubular heating element 230 is connected to an air cylinder 650. The piston (shown in FIG. 7) is attached to the trailing edge 235 of the heating element 230. The air cylinder allows the tube 230 to be pushed downward toward the film, or pulled upward away from the film. The leading edge 231 of the tube 230 is pivotably attached to a point 651 on the tubular heating assembly 600. This point serves as a hinge. In one mode, there is no or little air in the air cylinder 650, and the tubular heating element 230 is in a stowed position. FIG. 8A shows the tubular heating element in the stowed position, where the element 230 is raised above the plane of the film 237.

Figure 7:
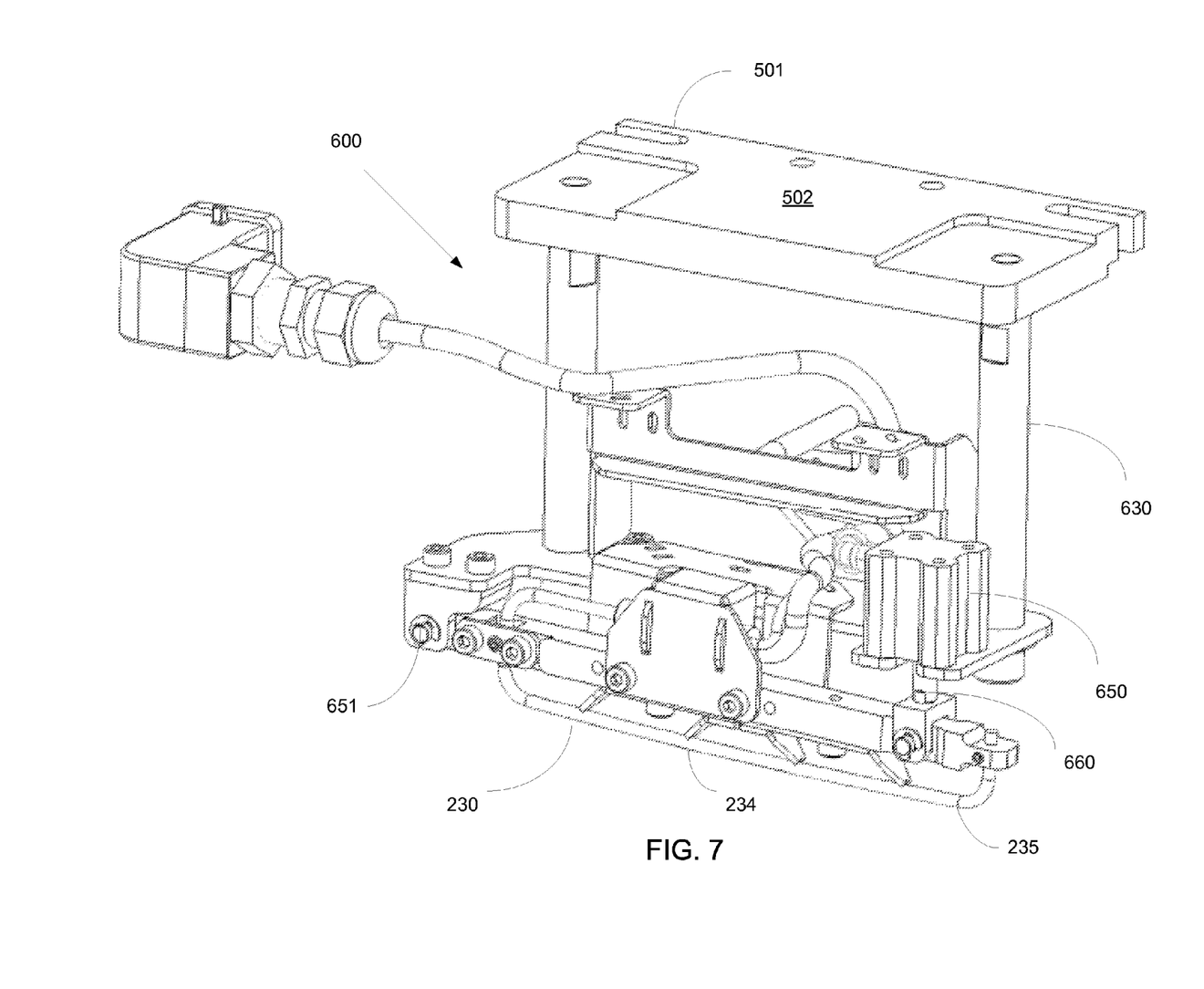
FIG. 7 shows a front view of the tubular heating element in an operative position.
Figure 8A:
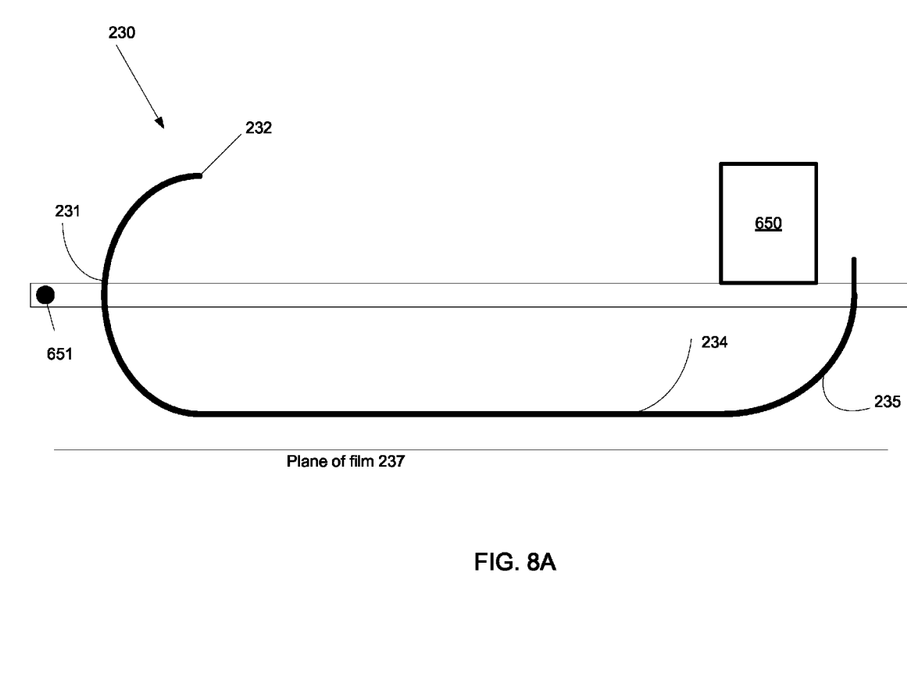
FIGS. 8A-8C illustrate the relationship of the tubular heating element to the film when in various positions.
Figure 8B:
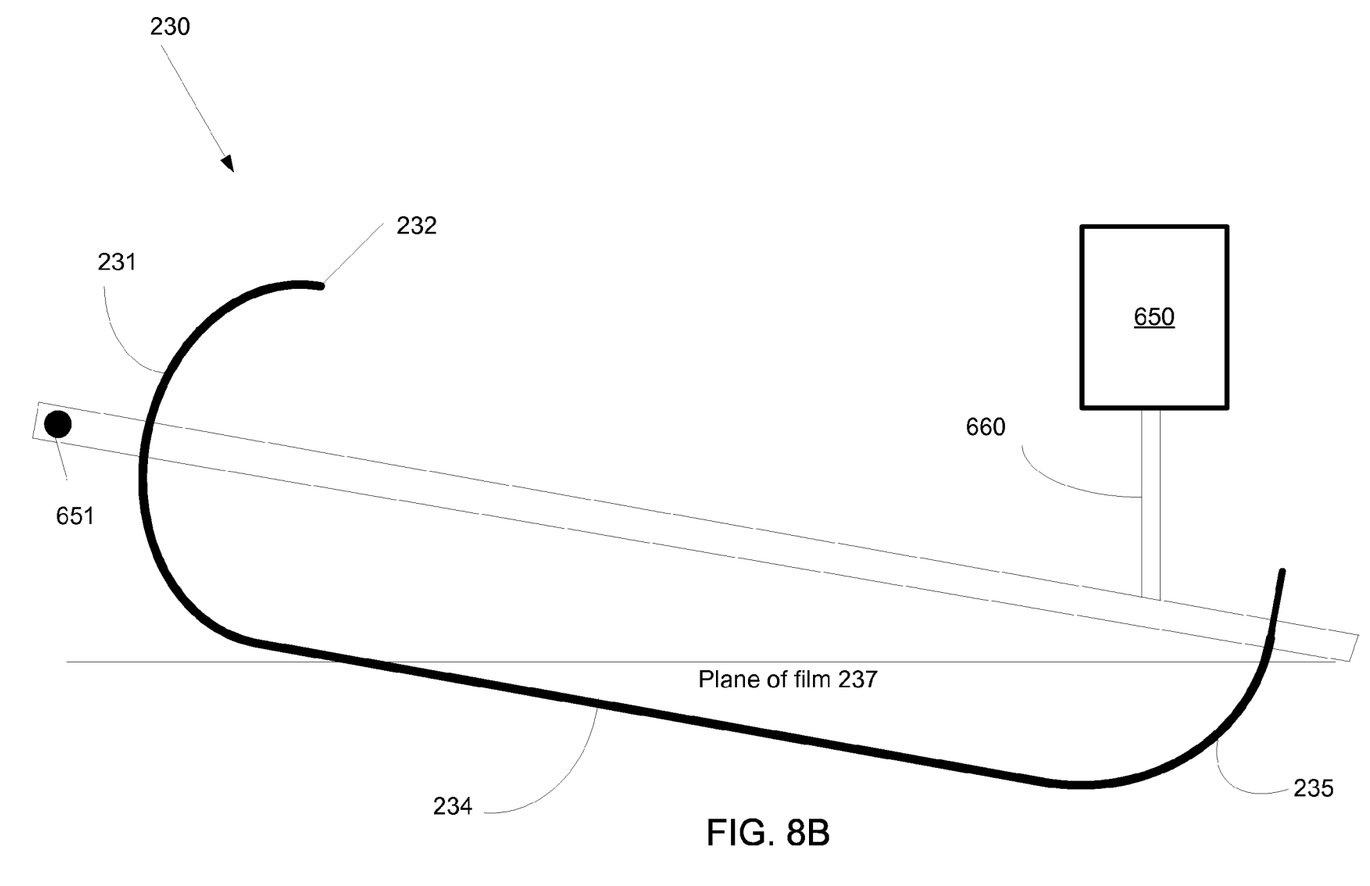

Air can then be introduced to the air cylinder 650, so as to force the piston 660 to extend downward from the air cylinder 650, as shown in FIG. 7. The air cylinder 650 causes the tubular heating element 230 to pivot about the hinge 651. This causes at least a portion of the extended straight portion 234 to extend below the plane of the film 237. FIG. 8B shows one active position for the tubular heating element 230 where the element extends beneath the plane of the film 237.

Figure 8C:
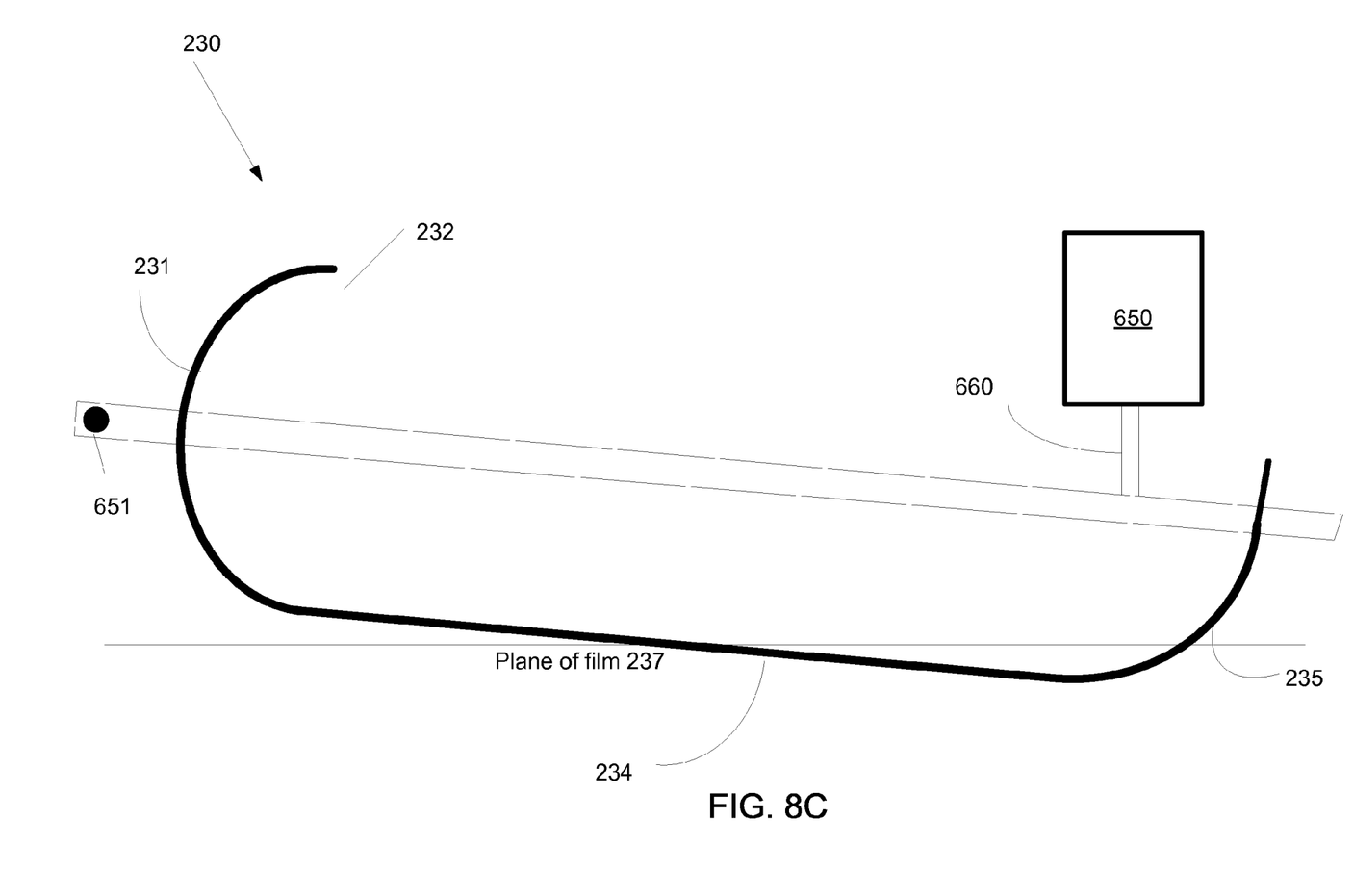

Note that the angle of the pivot can change the portion of the tubular heating element 230 that crosses the plane of the film 237. For example, FIG. 8B shows a relatively long extension of the piston 660. This causes a portion of the heating element 230 close to the leading edge 231 to cross the plane of the film 237. FIG. 8C shows the piston extended to a lesser degree. At this amount of extension, the portion of the heating element 230 that cross the plane of the film 237 has changed, and moved toward the trailing edge 235. Thus, by varying the amount that the piston 660 is extended, the portion of the heating element 230 that is exposed to the film can be modified. This feature can be used in several ways. First, the extension of the piston can be varied to change the portion of the element 230 that contacts the film. This may increase the life of the tubular heating element, or increase the time between required maintenance or cleaning operations. Secondly, the angle of the straight portion 234 of the tube 230 may be varied depending on the type and/or thickness of the film being used.

In one embodiment, the air cylinder 650 is an adjustable stroke air cylinder. In this embodiment, the amount of extension, or stroke, allowed by the piston 660 is limited by an adjustable mechanical stop. Thus, the portion of the tubular heating element 230 which is intended to contact the film can be changed by adjusting the mechanical stop. In another embodiment, a cylinder having multiple stop positions may be used, thereby allowing different portions of the heating element 230 to contact the film.

The above description relates to an air cylinder that is configured to be in the stowed position in the absence of applied air. However, other air cylinders may be used which are in the operative position in the absence of air. In these embodiments, air is introduced to move the heating element to the stowed position. Air is then removed to move the heating element to contact the film.

The above embodiment discloses a tubular heating element having a pivotable leading edge, with a biasing member on the trailing edge. However, in other embodiments, the leading edge may be attached to the biasing element, while the trailing edge is pivotable. In another embodiment, the pivot point may be located between the leading edge and trailing edge.

Figure 9A:
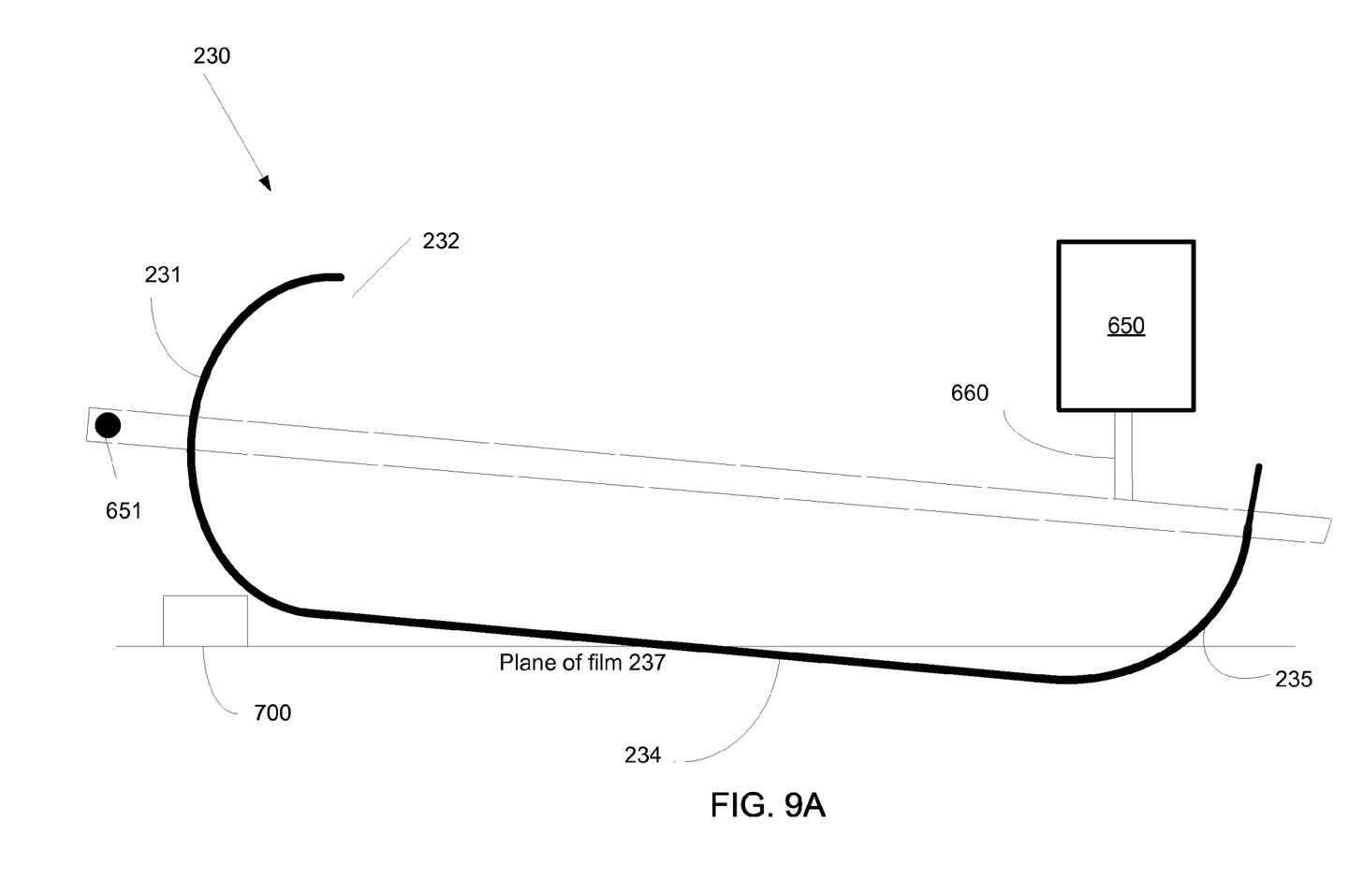
FIG. 9A-9B illustrate how the tubular heating element responds to a foreign material in its path.
Figure 9B:
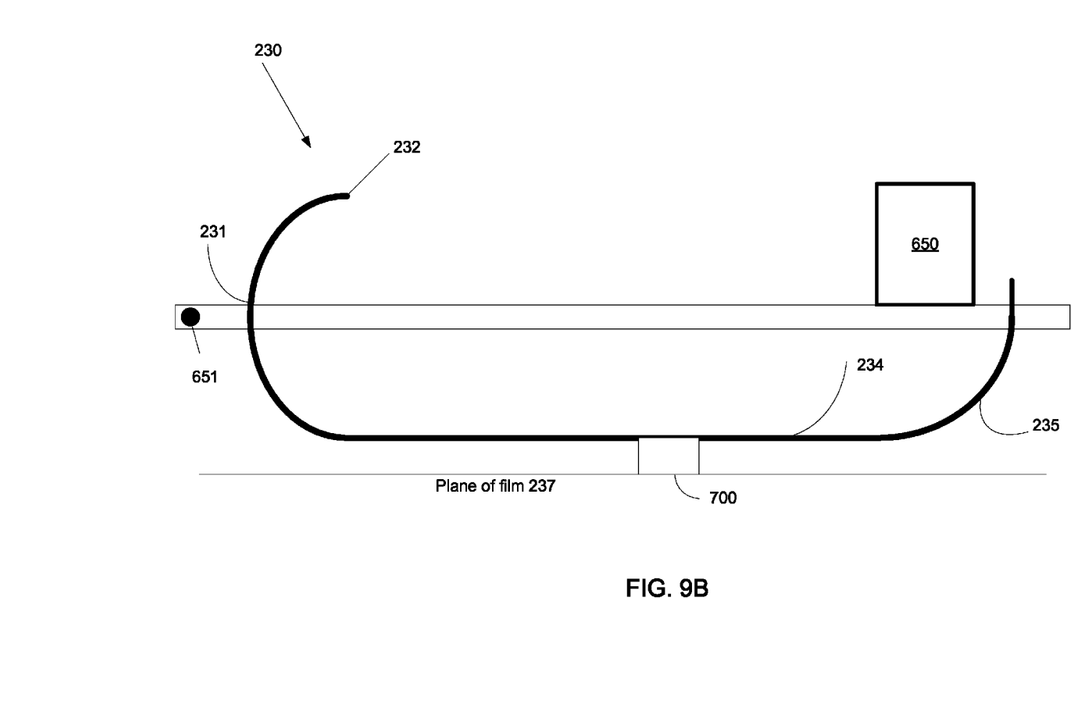

The use of an air cylinder 650 has other benefits as well. For example, the piston 660 is extended due to the force of the compressed air within the cylinder 650. The force exerted by the air on the piston is not infinite, and can be overcome by an opposing force. For example, FIG. 9A shows the tubular heating element 230 in the position shown in FIG. 8C. However, a foreign material 700 is positioned on the film in the path of the tubular heating element 230. As described above, with rigidly mounted heating elements, the foreign material may potentially damage the leading edge 231 of the tubular heating element 230. However, in this embodiment, the force exerted by the foreign material 700 on the tubular heating element is sufficient to overcome the force of the compressed air within the air cylinder 650. This then causes the piston 660 to retract from its extended position, and allow the tubular heating element 230 to be forced to its stowed position, as shown in FIG. 9B.

Thus, the use of an air cylinder attached near the trailing edge, and a rotatable pivot at or near the leading edge of the tubular heating element 230 allows many benefits currently not possible. This air cylinder allows the use of at least two different positions, an operational position (such as FIG. 8B and FIG. 8C) and a stowed position (FIG. 8A). In addition, the air cylinder allows the possibility to adjust the angle of the tubular heating element, and therefore, the portion of the tubular heating element that contacts the film. Finally, the air cylinder also allows the tubular heating element 230 to automatically move out of the plane of the film, if confronted with a foreign material, in the path of the heater.

Furthermore, the use of an air cylinder allows the movement of the tubular heating element 230 to be controlled automatically. For example, the side sealing machine 10 may include a controller. The controller consists of a processing unit, such as a microprocessor, PLC, embedded processor or other suitable device. The controller also includes a memory element adapted to store the instructions that are executed by the processing unit. In addition, the memory element may contain volatile data as required. The memory element may be a semiconductor memory device, such as RAM, EEPROM, FLASH ROM, DRAM or other technologies. It may also include magnetic or optical storage, such as disk drives, CDROMs, or DVDs. In one embodiment, the controller can be programmed to introduce air to the air cylinder prior to starting the pulleys, and programmed to draw air from the air cylinder when sealing is stopped or paused. Thus, the controller can control the position of the tubular heating element relative to the plane of the film prior to, during and after a sealing operation. In addition, in some embodiments, the controller may control the position of the tubular heater based on the type or thickness of the film being used.

Figure 10:
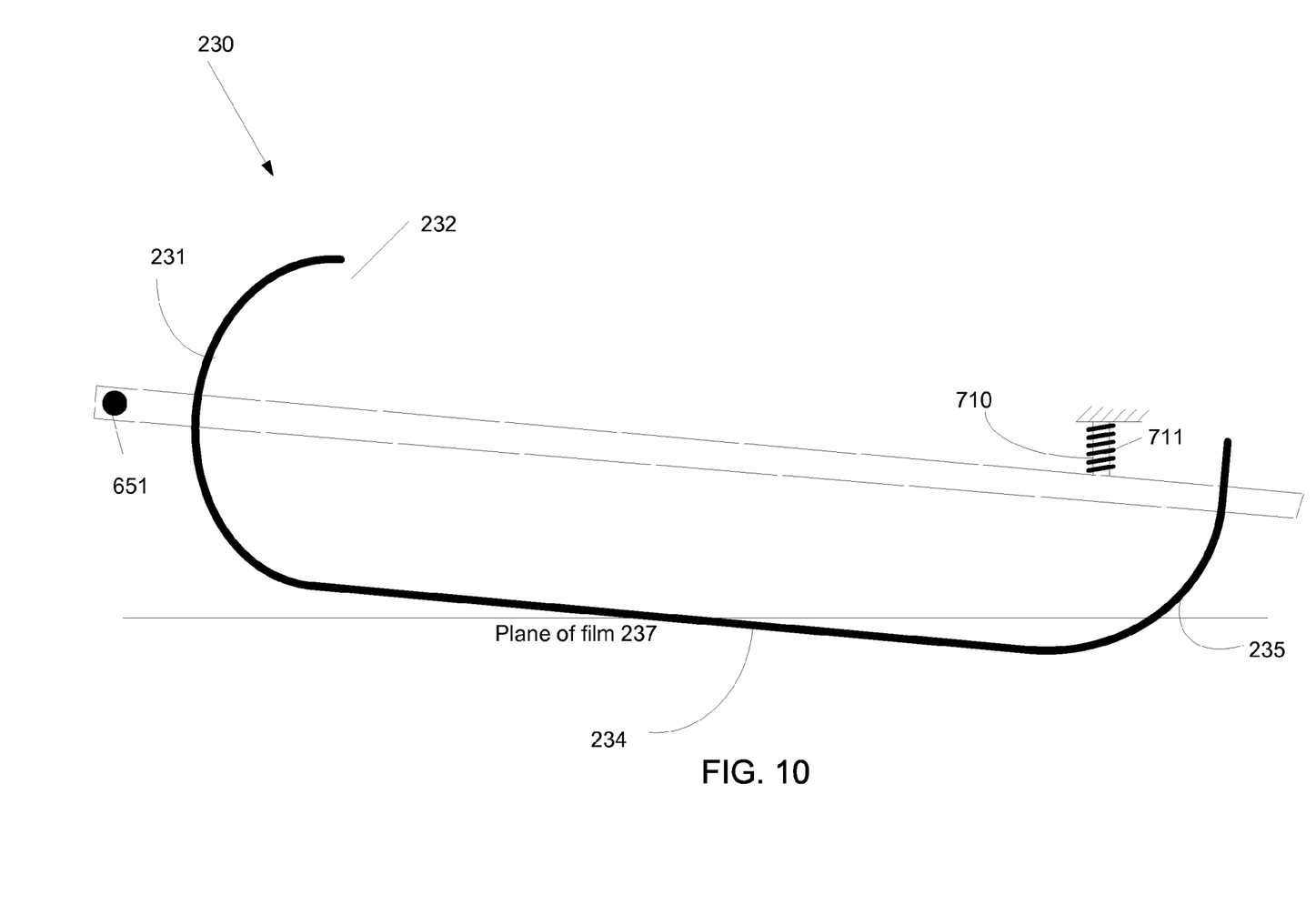
FIG. 10 shows another embodiment of the tubular heating element.

While the air cylinder offers these many benefits, in another embodiment, the only goal may be to create a mechanism that allows the heating element to move out of the plane of the film when confronted with a foreign material. In this case, as described above, the air cylinder may be used. However, other embodiments are also possible. For example, the air cylinder may be replaced with an extendable piston 710, which is biased downward with a spring 711 or other biasing member, as shown in FIG. 10. In this embodiment, the foreign material would push against the downward force of the spring 771 or other biasing member and cause the tubular heating element 230 to rotate so as to be above the plane of the film 237. This allows the foreign material to pass under the element 230, without causing any damage to that element. In addition, any suitable biasing member may be used. For example, an electronic solenoid may also be used.

While the present disclosure describes the use of air cylinders and other biasing members with tubular heating elements, the disclosure is not limited to this embodiment. For example, other heating/cutting/sealing devices, such as heated blades or hot wires may also benefit from the use of biasing members to allow movement relative to the plane of the film.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A side sealing machine for sealing a film, comprising:
   a tubular heating element that contacts said film, having a leading edge adapted to encounter said film first, and a trailing edge adapted to encounter said film after said leading edge;
   a biasing member attached to said trailing edge, which in one position, urges said trailing edge downward toward a plane of said film; wherein said heating element is rotatably attached to a pivot point on said machine, and wherein said biasing member is biased with a force sufficiently small so as to be overcome by a foreign material located on said film in the path of said tubular heating element, so that said foreign material causes said tubular heating element to rotate to a position where said tubular heating element is at a level above said plane of said film.

2. The side sealing machine of claim 1, further comprising two belts, disposed on either side of said tubular heating element and parallel to a direction of travel of said film, to guide and hold said film as it passes said tubular heating element, wherein rotation of said tubular heating element is independent of said belts.

3. The side sealing machine of claim 1, wherein said biasing member comprises an air cylinder.

4. The side sealing machine of claim 3, wherein said air cylinder, when not filled with air, has a second stowed position in which said tubular heating element is retracted to a level above said plane of said film.

5. The side sealing machine of claim 3, wherein said air cylinder comprises a extendable piston having a plurality of stroke lengths, such that said tubular heating element may be rotated at a plurality of angles.

6. The side sealing machine of claim 1, wherein said biasing member comprises a spring.

7. The side sealing machine of claim 1, wherein said biasing member comprises an electronic solenoid.

8. The side sealing machine of claim 3, further comprising a controller, configured to introduce air into said air cylinder.

9. The side sealing machine of claim 1, wherein said leading edge of said heating element is rotatably attached to said pivot point on said machine.

10. A side sealing machine for sealing a film, comprising:
    a tubular heating element that contacts said film, having a leading edge adapted to encounter said film first, and a trailing edge adapted to encounter said film after said leading edge;
    a biasing member attached to said leading edge, which in one position, urges said leading edge downward toward a plane of said film; wherein said trailing edge is rotatably attached to a pivot point on said machine, and wherein said biasing member is biased with a force sufficiently small so as to be overcome by a foreign material located on said film in the path of said tubular heating element, so that said foreign material causes said tubular heating element to rotate to a position where said tubular heating element is at a level above said plane of said film.

11. The side sealing machine of claim 10, further comprising two belts, disposed on either side of said tubular heating element and parallel to a direction of travel of said film, to guide and hold said film as it passes said tubular heating element, wherein rotation of said tubular heating element is independent of said belts.

12. The side sealing machine of claim 10, wherein said biasing member comprises an air cylinder.

13. The side sealing machine of claim 10, wherein said biasing member comprises a spring.

14. The side sealing machine of claim 10, wherein said biasing member comprises an electronic solenoid.

15. The side sealing machine of claim 12, further comprising a controller, configured to introduce air into said air cylinder.

16. The side sealing machine of claim 1, wherein said tubular heating element comprises a tube having a circular cross-section, said tube having a semi-circular leading edge and a straight portion extending from said leading edge, and wherein a heater is disposed in said tube.

17. The side sealing machine of claim 10, wherein said tubular heating element comprises a tube having a circular cross-section, said tube having a semi-circular leading edge and a straight portion extending from said leading edge, and wherein a heater is disposed in said tube.

* * * * *